(12) United States Patent
Peng

(10) Patent No.: US 7,101,628 B2
(45) Date of Patent: *Sep. 5, 2006

(54) THERMOPLASTIC VULCANIZATE AND MEMBRANE FOR COVERING A ROOF MADE THEREFROM

(75) Inventor: Lichih Richard Peng, Fishers, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 148 days.

This patent is subject to a terminal disclaimer.

(21) Appl. No.: 10/393,692

(22) Filed: Mar. 20, 2003

(65) Prior Publication Data

US 2004/0185288 A1    Sep. 23, 2004

(51) Int. Cl.
B32B 27/32    (2006.01)

(52) U.S. Cl. .................. 428/516; 428/519; 428/520; 525/240; 525/242; 525/329.7

(58) Field of Classification Search .......... 428/515, 428/516, 519, 492, 493, 520; 525/240, 242, 525/329.7
See application file for complete search history.

(56) References Cited

U.S. PATENT DOCUMENTS

| | | | | |
|---|---|---|---|---|
| 4,948,840 A * | 8/1990 | Berta | ............ | 525/193 |
| 4,990,566 A | 2/1991 | Hert | ............ | 525/179 |
| 5,051,478 A | 9/1991 | Puydak et al. | ............ | 525/195 |
| 5,143,978 A * | 9/1992 | Berta | ............ | 525/240 |
| 5,389,715 A | 2/1995 | Davis et al. | ............ | 524/505 |
| 5,525,679 A | 6/1996 | Effler, Jr. et al. | ........ | 525/334.1 |
| 5,552,482 A * | 9/1996 | Berta | ............ | 525/88 |
| 5,565,521 A | 10/1996 | Effler, Jr. et al. | ............ | 525/146 |
| 5,668,220 A | 9/1997 | Effler, Jr. et al. | ........ | 525/333.6 |
| 5,733,980 A | 3/1998 | Cozewith et al. | ............ | 525/314 |
| 5,840,109 A | 11/1998 | Braga et al. | ............ | 106/273.1 |
| 6,048,909 A | 4/2000 | Chaudhary et al. | ............ | 521/81 |
| 6,114,486 A | 9/2000 | Rowland et al. | ............ | 526/352 |
| 6,130,282 A * | 10/2000 | Imahashi et al. | ............ | 524/436 |
| 6,143,829 A | 11/2000 | Babb et al. | ............ | 525/194 |
| 6,169,145 B1 | 1/2001 | Medsker et al. | ............ | 525/100 |
| 6,184,290 B1 | 2/2001 | Ahmed et al. | ............ | 525/98 |
| 6,184,291 B1 | 2/2001 | Ahmed et al. | ............ | 525/98 |
| 6,207,754 B1 | 3/2001 | Yu | ............ | 525/133 |
| 6,506,842 B1 * | 1/2003 | Heck et al. | ............ | 525/194 |
| 6,864,195 B1 * | 3/2005 | Peng | ............ | 442/41 |
| 2004/0033741 A1 * | 2/2004 | Peng | ............ | 442/38 |
| 2004/0052983 A1 * | 3/2004 | Hubbard et al. | ............ | 428/33 |
| 2004/0087751 A1 * | 5/2004 | Tau et al. | ............ | 526/348.1 |
| 2004/0118592 A1 * | 6/2004 | Pehlert | ............ | 174/110 R |

* cited by examiner

Primary Examiner—D. Lawrence Tarazano
(74) Attorney, Agent, or Firm—Scott McCollister; Michael R. Huber

(57) ABSTRACT

Broadly, the present invention provides a thermoplastic vulcanizate which can be readily processed into sheeting material for covering a roof that is both flexible and highly elastic. Where other thermoplastic elastomeric compositions have either been too stiff to act as roofing membranes or not processable due to their melt flow characteristics, the present thermoplastic vulcanizate employs a polypropylene random copolymer resin and a polyethylene random copolymer resin having about 10 to about 35 percent by weight α-olefin co-monomer units; together with a compatibilizing rubber and a peroxide-based cross-linking agent, to provide an effective membrane for covering roofs.

26 Claims, No Drawings

THERMOPLASTIC VULCANIZATE AND MEMBRANE FOR COVERING A ROOF MADE THEREFROM

BACKGROUND OF THE INVENTION

The present invention relates generally to a thermoplastic vulcanizate, and more particularly, to a thermoplastic vulcanizate suitable for use as a membrane for covering roofs.

Polymeric sheeting material has been used for several years in the roofing and construction industry for covering industrial and commercial flat roofs of new buildings and for refurbishing the roofs of older buildings. Typically, such sheeting material is generally applied to a roof surface in the form of a single ply of roof sheeting material. Alternatively, a double-ply roof sheet, often referred to in the industry as a "bilaminate," may be used. Whether single- or double-ply, such roofing materials for covering large buildings are customarily available in sheets having a length up to several hundred feet and a width of from about 3 feet to about 50 feet.

During installation, a number of edge-joining methods can be employed. For example, the roofing membranes may be primed with a liquid-applied splice adhesive at their overlapped edges and the primed overlapped edges joined together to form a weather-impermeable sealing barrier. Alternatively, a splicing tape has been used. In the case of other roofing membranes, adjacent margins of adjacent sheets are solvent-welded or heat-welded in overlapping relationship to form a sealing membrane.

Generally, roofing applications require a roofing membrane to be very flexible in order to precisely conform to the contours of the deck of the roof to which it must be affixed. Yet, the membrane must be resilient enough to protect the roof to which it is applied. To that end, elastic properties of the polymeric sheeting can be important as they can affect the dimensional stability and tear resistance of a roofing membrane over time. To perform as an effective roofing membrane, it is preferred that the ultimate tensile of elongation of the membrane after thermal aging not decrease significantly. Such a requirement means that the membrane must also have a high tensile strength. Effective performance of the membrane further requires that the high tensile strength be accomplished without sacrificing the other properties that make a resin suitable or desirable for production of a roofing membrane such as burn resistance, ultraviolet degradation resistance and ready processability, as well as aesthetics.

Thermoset materials such as ethylene-propylene copolymers (EPM) and ethylene-propylene-diene terpolymers (EPDM) have been extensively made into polymeric sheeting for use as roofing membranes. EPM and EPDM sheeting materials usually are prepared by compounding the EPM, EPDM or mixtures thereof with the appropriate fillers (e.g., carbon black), processing materials, curing additives and other optional ingredients, in a suitable mixer and calendering the resulting compound into a sheet of desired dimensions.

While curing imparts beneficial properties to roofing membranes, a disadvantage of thermoset compositions (e.g., EPM and EPDM) is the difficulty with which successive sheets of these elastomers adhere to one another. This can be a serious problem, because in applying elastomeric sheets to a roof, they are usually spliced or otherwise attached at their edges in order to form a continuous watertight barrier. These splice or seam areas are subjected to both short-term and long-term stresses such as those caused by roof movement, heavy winds, freeze-thaw cycling and thermal cycling. Such stresses may manifest themselves in shear forces or peel forces. For example, a lapped seam or edge may peel back and separate under severe stress conditions, resulting in a half-cylindrical or half-conical opening or void in the lapped seam or edge (known as a "fishmouth" or "edge wrinkle" condition) under less severe conditions.

One solution to this problem has been the use of thermoplastic materials. Polyvinyl chloride or "PVC" roofing membrane sheets have been used since the 1960s. Plasticized PVC compositions meet the high tensile strength service requirement of roofing membranes, while also retaining other properties required for service as a roofing membrane. Plasticized PVC compositions, however, have not met all of the needs of a flexible membrane. The plasticizer required to impart processability to the PVC resin so that it may be fabricated into a membrane, tends over time to migrate to the surface of the roofing membrane upon exposure to ultraviolet light. Having a high surface area, the membrane loses plasticizer over its service lifetime, thereby promoting hairline cracks, which in time can lead to the eventual failure of the PVC roofing membrane. Additionally, the chloride content of PVC membranes poses an environmental hazard.

In more recent years, thermoplastic elastomers or "TPEs" have been used as a solution to adhesion problems experienced with thermoset compositions. The typical TPE structure is that of a matrix of a hard, plastic component with discrete domains of a softer, elastomeric component embedded therein. This structure yields a composite having a behavior similar to a cured elastomer, but with the advantage that it undergoes plastic flow above the softening point of the plastic component. This permits TPEs to be fabricated into thin sheets via calendering.

When both the plastic and elastomeric components of a TPE are at least predominantly olefinic, the resulting polymer is referred to as a thermoplastic olefin or "TPO." A typical TPO is a melt blend or a reactor blend of a polyolefin plastic, typically polypropylene, with an olefin copolymer elastomer (OCE), typically an ethylene-propylene rubber. The polyolefin plastic imparts to the TPO superior melt flowability, while the olefin copolymer elastomer provides flexibility.

Nonetheless, TPOs have been used in the prior art roofing membranes with only limited success. The elastic properties of TPOs are specifically an issue because TPOs generally cannot be folded and have a non-recoverable deformation nature. Furthermore, when successive sheets of a TPO roofing membrane are applied to a flat roof surface and spliced together side by side, shrinkage with the help of reinforced scrim may result thereafter pulling the seams apart and resulting in a leaky roof. Also, the fluid-like melt of TPOs makes weld seams difficult to control, making scrim support necessary to increase the dimensional stability of the roofing membrane. Additionally, some TPO membranes, particularly black TPO sheets which absorb more heat, shift in weather extremes, becoming baggy in the summer and taut to the point of straining in the winter. As to processability (calendering) of TPOs, the low melt strength of TPOs may cause high neck down, with gauge being highly dominated by line speed. Laminated sheet may be highly oriented in the machine direction resulting in low tear in machine direction.

Conventional elastomeric roof-sheeting materials have also proven problematic as they are susceptible to burning when exposed to open flame. Enhanced flame resistance can be imparted to a small extent by use of olefinic elastomers, fillers such as antimony trioxide, decabromo diphenyl oxide (DBDPO), dechlorane (chlorinated alicyclic hydrocarbon) alumina trihydrate, and chlorinated or brominated paraffins, and the like, which can be incorporated into the composition. However, the capacity of such roof-sheeting membranes to accept flame retardant fillers is limited, typically on the order of about 5 to about 15 parts by weight flame retardant fillers per 100 parts by weight rubber, especially with membranes which exhibit thermoplastic characteristics.

Also, fully cured thermoset EPM/EPDM is traditionally reinforced with carbon black. A black color is generally imparted to conventional roofing membranes because of the use of carbon black, as well as coal filler and related petroleum-derived materials or other similarly dark-colored fillers, in the composition from which the sheeting material is prepared. While having other desirable properties, a black roofing sheet can have the effect of raising the interior temperature of a building as it readily absorbs radiant energy from the sun. Accordingly, various attempts have been made to provide non-black and, more specifically, mineral-filled, white roof sheeting compositions with no sacrifice in the aforementioned desirable properties.

White rubber membrane compositions have been typically produced from a variety of the polymeric rubbers listed hereinabove and non-black mineral fillers such as soft and hard clays, chemically modified clays, calcium carbonate, silicas, talc, mica or titanium dioxide, and non-staining process oils. While these white rubber membranes can be used by themselves on a roof, they are more often laminated to standard black rubber membranes which are well known in the art. Typically, this is done by separately extruding and preferably calendering the white rubber membrane compounds and the black rubber membrane compounds and then laminating them together by either a calendering or coextrusion process while the membranes are still in the uncured state. Thus, the black and white rubber plies which comprise the bilaminate are knitted together during the curing process, the mineral filled, white-colored roof sheeting material preferably serving as the top ply and the carbon black-reinforced sheeting material serving as the bottom ply of the membrane bilaminate.

Unfortunately, attempts at fashioning a non-black roofing sheet have proven a challenge to those skilled in the art. Previous attempts to fashion a non-black roofing sheet of any composition have resulted in sheets lacking the essential properties of long term weathering, burn resistance and ready processability.

SUMMARY OF THE INVENTION

Broadly, the present invention provides a thermoplastic vulcanizate which can be readily processed into sheeting material for covering a roof that is both flexible and highly elastic. Where other thermoplastic elastomeric compositions have either been too stiff to act as roofing membranes or not processable due to their melt flow characteristics, the present thermoplastic vulcanizate employs a polypropylene random copolymer resin and a polyethylene copolymer resin, together with a compatibilizing rubber and a peroxide-based cross-linking agent, to provide an effective membrane for covering roofs. Moreover, it has been found that significant amounts of less costly flame retardant fillers can be added to the composition without significantly affecting the properties of the vulcanizate.

The advantages of the present invention over the known art relating to thermoplastic vulcanizates and roofing membranes, which shall become apparent from the specification that follows, are accomplished by the invention as hereinafter described and claimed.

In general, one or more aspects of the invention may be accomplished by a thermoplastic vulcanizate comprising a reaction product of a melt blend of at least one polypropylene random copolymer, at least one polyethylene copolymer containing from about 10 to about 30 percent by weight of repeating α-olefin co-monomer units, at least one compatibilizing rubber, and at least one peroxide-based cross-linking agent, wherein the compatibilizing rubber is simultaneously dispersed as fine particles throughout the mixture and cross-linked.

One or more other aspects of the invention may be accomplished by a roofing membrane comprising at least one ply of material comprising a thermoplastic vulcanizate, the thermoplastic vulcanizate comprising a reaction product of a melt blend of at least one polypropylene random copolymer; at least one polyethylene copolymer containing from about 10 to about 30 percent by weight of repeating α-olefin co-monomer units; at least one compatibilizing rubber; at least one peroxide-based cross-linking agent; at least one filler; and optionally, one or more additives selected from the group consisting of oils, pigments, thermal stabilizers, antioxidants, imidazole-type inhibitors, and UV or light stabilizers; wherein the compatibilizing rubber is simultaneously dispersed throughout the polymer matrix and cross-linked.

Still another aspect of the invention may be accomplished by a method for making a membrane for covering a roof comprising preparing a thermoplastic vulcanizate by melt blending at least one polypropylene random copolymer, at least one polyethylene copolymer containing from about 10 to about 30 percent by weight of repeating α-olefin co-monomer units, at least one compatibilizing rubber, at least one peroxide-based cross-linking agent, at least one filler, and optionally, one or more additives selected from the group consisting of oils, pigments, thermal stabilizers, antioxidants and UV or light stabilizers, wherein the compatibilizing rubber is simultaneously dispersed as fine particles throughout the mixture and cross-linked; and calendering the thermoplastic vulcanizate into sheets.

Yet another aspect of the invention may be accomplished by a bilaminate roofing membrane comprising a first layer of a non-black sheeting comprising a thermoplastic vulcanizate formed from the reaction product of a melt blend comprising at least one polypropylene random copolymer; at least one polyethylene copolymer containing from about 10 to about 30 percent by weight of repeating α-olefin co-monomer units; at least one compatibilizing rubber; at least one peroxide-based cross-linking agent; at least one non-black filler; and optionally, one or more additives selected from the group consisting of oils, thermal stabilizers, antioxidants, and UV or light stabilizers, wherein the compatibilizing rubber is simultaneously dispersed throughout the copolymer matrix and cross-linked; and a second layer of a black sheeting comprising a thermoplastic vulcanizate formed from the reaction product of a melt blend comprising at least one polypropylene random copolymer; at least one polyethylene copolymer containing from about 10 to about 30 percent by weight of repeating α-olefin co-monomer units; at least one compatibilizing rubber; at least one peroxide-based cross-linking agent; at least one black filler; and optionally, one or more additives selected from the group consisting of oils, thermal stabilizers, antioxidants, and UV or light stabilizers; wherein the compatibilizing rubber is simultaneously dispersed throughout the copolymer matrix and cross-linked; and wherein said first and second layers are attached together.

DETAILED DESCRIPTION OF THE INVENTION

As noted hereinabove, the present invention is directed to a thermoplastic vulcanizate which is the reaction product of a melt blend of at least one polypropylene random copolymer resin; at least one polyethylene copolymer resin having from about 10 to about 30 percent by weight of repeating α-olefin co-monomer units; at least one compatibilizing rubber; and a peroxide-based cross-linking agent, wherein the compatibilizing rubber is simultaneously dispersed throughout the resin matrix and cross-linked. The presence of the compatibilizing rubber allows for the inclusion in the melt blend of from about 5 to up to about 90 parts by weight fillers per hundred parts rubber, including but not limited to flame retardants. The polyethylene copolymer resin, having from about 10 to about 30 percent by weight of repeating α-olefin co-monomer units, allows for the ready calendering of the thermoplastic vulcanizate into a membrane for covering roofs.

This invention involves the use of a blend of from about 1 to about 40 parts by weight of one or more polypropylene random copolymers, from about 20 to about 90 parts by weight of one or more polyethylene copolymers, and from about 10 to about 50 parts by weight of one or more compatibilizing rubbers to provide 100 parts by weight rubber, and from about 0.5 to about 1.5 parts by weight of one or more peroxide-based cross-linking agents, based on the 100 parts by weight rubber. More preferably, the invention includes from about 5 to about 90 parts by weight of one or more fillers, per 100 parts by weight rubber, wherein from about 5 to about 70 parts of the fillers may be one or more flame retardants.

The polypropylene random copolymer resin (PP random copolymers) preferably comprise from about 50 to about 99 percent by weight repeating propylene monomer units and from about 1 to about 50 percent by weight repeating ethylene co-monomer units, wherein the monomer and co-monomer units are randomly polymerized throughout the copolymer. The co-monomer may be a monomer other than ethylene, but preferably is an olefin monomer having from 2 to 20 carbon atoms, including butene, hexane, octene, or combinations thereof.

The PP random copolymers used in the present invention may have a melt flow rate (MFR) of from about 1 to about 20 g/10 minutes. More preferably, they may have a MFR of from about 8 to about 14 g/10 minutes. Most preferably, they may have a MFR of from about 10 to about 12 g/10 minutes. Additionally, the PP random copolymers used in the present invention may have a melt point between 125° C. and 155° C. More preferably, they may have a melt point between 135° C. and 145° C. Most preferably, they may have a melt point between 140° C. and 150° C. Examples of PP random copolymers suitable for use in embodiments of the present invention include, but are not limited to those commercially available under the trade names 7620Z and 7622MZ from ATOFina of Philadelphia, Pa., TR-3020-SF from Sunoco, and PP9574, PP9852 from ExxonMobil.

The thermoplastic vulcanizate embodiments of this invention also employ polyethylene copolymers having a high α-olefin co-monomer content, namely from about 10 to about 30 percent by weight of repeating α-olefin co-monomer units, produced via a process involving organometallic coordination catalysts. One suitable polyethylene copolymer is metallocene-catalyzed polyethylene copolymer (m-PE copolymers). The m-PE copolymers used in one embodiment of this invention comprises at least 70 percent by weight repeating ethylene monomer units and at least 10 percent by weight of repeating α-olefin co-monomer units, wherein the monomer and co-monomer units are randomly polymerized throughout the copolymer. In a more preferred embodiment, the α-olefin co-monomer units may be octene units. Other co-monomer units may include any α-olefin monomer having from 2 to 8 carbon atoms, including butene and hexene. Preferably, the polyethylene copolymer will have from about 70 to about 90 percent ethylene monomer units and from about 10 to about 35 α-olefin co-monomer units. Even more preferably, the copolymer may employ from about 78 to about 82 percent ethylene monomer units and from about 18 to about 22 percent α-olefin co-monomer units.

The m-PE copolymers used in embodiments of the present invention may have a melt index (MI) of from about 0.5 to about 10 g/10 minutes. More preferably, they may have a MI of from about 4 to about 6 g/10 minutes. Additionally, the m-PE copolymers used in embodiments of this invention are "high melt flow" polyethylene copolymers. By the term "high melt flow" it is meant that the m-PE copolymers have a melt point between 45° C. and 85° C. More preferably, they may have a melt point between 55° C. and 75° C. Most preferably, they may have a melt point between 65° C. and 69° C. The m-PE copolymers used in embodiments of this invention also may have a density of about 0.860 to about 0.900 g/cc. More preferably, they may have a density of about 0.865 to about 0.875 g/cc. Suitable m-PE Copolymers may include, but are not limited to, those available commercially under the trade names Engage™ 8452 and Engage™ 8200 from DuPontDow of Wilmington, Del.

The rubber component employed for purposes of this thermoplastic vulcanizate is a "compatibilizer," meaning that the rubber component improves the compatibility between the fillers and the other components of the melt blend. Fillers, as further described below, include inert materials added to improve the burn resistance, weathering and autoblocking of a polymeric roofing membrane composition. Heretofore, most thermoplastic components could not be suitably melt blended with flame retardants exceeding 15 parts by weight flame retardants per 100 parts rubber. When melt blended with the thermoplastic components of the present invention, the compatibilizing rubber facilitates the inclusion of about 5 to about 70 parts and, more preferably from about 15 to 45 parts by weight flame retardants in the melt blend. Compatibilizing rubbers useful for purposes of this thermoplastic vulcanizate include, but are not limited to, ethylene vinyl-acetate (EVA), ethylene methyl acrylate (EMA), and methyl acrylic rubber (MA).

The ethylene vinyl acetates (EVA) used in embodiments of the present invention may have a melt index (MI) of from about 1 to about 11 g/10 minutes. More preferably, they may have a MI of from about 3 to about 9 g/10 minutes. Most preferably, they may have a MI of from about 5 to about 7 g/10 minutes. Additionally, the EVAs used in embodiments of the present invention may have a vinyl acetate content of from about 18% to about 50%. More preferably, they may have a vinyl acetate content of from about 23% to about 33%. Most preferably, they may have a vinyl acetate content of from about 27% to about 29%. The EVAs used in embodiments of the present invention may have a hardness Shore A of from about 62 to about 89. More preferably, they may have a hardness Shore A of from about 72 to about 82. Most preferably, they may have a hardness Shore A of from about 77 to about 81. Suitable EVAs for purposes of the present invention may include, but are not limited to those commercially available under the trade name UE 634-006 from Equistar of Houston, Tex.

By employing EVA, it has also been found that additional low cost aluminum trihydrate (ATH) may be used as a flame retardant rather than more costly magnesium hydroxide (MgOH). Tests have shown that the crosslinked rubber (EVA) helps to increase the decomposition temperature of ATH significantly, from around 235° C. to about 280° C. Thus, more ATH can be used in the composition.

Ethylene methyl acrylate copolymers (EMA) are used in another embodiment of the present invention. Suitable EMAs may have a melt flow rate (MFR) of from about 0 to about 12 g/10 minutes. More preferably, they may have an MFR of from about 2 to about 10 g/10 minutes. Most preferably, they may have an MFR of from about 4 to about 6 g/10 minutes. Additionally, the EMAs used in an embodiment of the present invention may have a methyl acrylic rubber content of from about 17% to about 37%. More preferably, they may have a methyl acrylic rubber content of from about 22% to about 32%. Most preferably, they may have a methyl acrylic rubber content of from about 26% to about 28%. The EMAs used in an embodiment of the present invention may have a hardness Shore A of from about 69 to about 89. More preferably, they may have a hardness Shore A of from about 74 to about 84. Most preferably, they may have a hardness Shore A of from about 77 to about 81. Suitable EMAs for purposes of the present invention may include, but are not limited to, those commercially available under the trade name Optema™ from Exxon Chemical Company of Houston, Tex.

Methyl acrylic rubbers (MA) are used in still another embodiment of the present invention. Suitable MAs for purposes of the present invention may include, but are not limited to those commercially available under the trade name Vamac™ D from DuPont Chemicals of Wilmington, Del.

The rubber component of the present invention undergoes dynamic vulcanization. "Vulcanization" is the chemical cross-linking of high-molar-mass or slightly branched polymers mainly used in rubber chemistry to give a polymer network with viscoelastic or elastomeric properties. "Dynamic vulcanization" involves the cross-linking of the elastomer phase while the mixture is being highly sheared.

In this thermoplastic vulcanizate, a peroxide-based cross-linking agent is employed to achieve dynamic vulcanization. The peroxide-based cross-linking agent used in one embodiment of the present invention comprises 40 percent active dicumyl peroxide supported on precipitated calcium carbonate. Suitable peroxide-based cross-linking agents may include, but are not limited to, those sold commercially by Hercules Inc., of Wilmington, Del., under the trade name DiCup40C.

Generally, cross-linking agents may be used alone or in combination with a catalyzing agent. Useful catalyzing agents for purposes of the present invention include N,N'-m-phenylene dimaleimide, which is commercially available under the trade name HVA-2 from DuPont Dow of Wilmington, Del.

In addition to these components, as stated above, the present invention may include from about 5 to about 90 parts by weight fillers. Generally, fillers are inert materials that decrease a roofing composition's cost while improving its stiffness and hardness. Useful organic and inorganic particulate fillers include saw dust, wood fillers (such as wood flour or wood fibers), paper fibers, corn husks, straw, cotton, carbon black or graphite, talc, calcium carbonate, flyash, alumina trihydrate, glass fibers, marble dust, cement dust, clay, feldspar, silica or glass, fumed silica, alumina, magnesium oxide, zinc oxide, barium sulfate, aluminum silicate, calcium silicate, titanium dioxide, titanates, glass microspheres and chalk.

Talc is used as a filler in one embodiment of the present invention. Talc is a natural hydrous magnesium silicate generally having the formula: $Mg_3Si_4O_{10}(OH)_2$ or $3MgOH$ $4SiO_2 \cdot HOH$. Talcs useful in the present invention may include, but are not limited to, those sold commercially under the trade name Microtuff™ AG609-D by Specialty Minerals Inc., of Bethlehem, Pa.

Carbon Black is another filler used in an embodiment of the present invention. Carbon Black is a finely divided form of carbon having a variety of uses in commercial industry. Carbon blacks used in embodiments of the present invention may include, but are not limited to those sold by Cabot Corp of Alpharetta, Ga., under the trade name C-Black N650.

As further stated above, fillers also include flame retardants. Flame retardants inhibit the creation and spread of fire; they are either halogenated or nonhalogenated. Flame retardants are an important component of membranes used for roofing applications because they increase the safety of the overall roofing structure.

Nonhalogenated flame retardants have many different embodiments. Examples are magnesium hydroxide treated with stearic acid or aminosilane, aluminum hydrates/hydroxides, and aluminum silicas. One type of nonhalogenated flame retardant is a high purity, low surface area, Magnesium Hydroxide. It is a highly effective flame retardant and smoke suppressant and is useful in cables, polyolefins, roofing, and nylon applications. Magnesium Hydroxide flame retardants may be treated with stearic acid or vinyl, aluminum hydrates/hydroxides, and aluminum silicas. The flame retardant effect is achieved by the endothermic decomposition of Magnesium Hydroxide up to 340° C. with resultant cooling by the release of water vapor. Nonhalogenated flame retardants used in the present invention's compositions may include, but are not limited to a aminosilicone treated magnesium hydroxide sold commercially under the trade name FR-20/418 by Ameribrom, Inc., of New York, N.Y.; and stearic acid treated magnesium hydroxide sold commercially under the trade name FR20MHRM120.

In addition to the foregoing components a number of additives are useful in the practice of the present invention, and may be introduced into the blend before, during or after curing. Examples of such additives are rubber processing oils, pigments, thermal stabilizers, ultraviolet stabilizers and other additives known to the rubber compounding art.

Pigments are useful in the practice of the present invention. Any substance that imparts color to another substance or mixture is useful as a pigment. Titanium Dioxide is used as a pigment in one embodiment of the present invention. Titanium Dioxide is a white powder having two crystalline forms, anatase and rutile; it has the greatest hiding power of all white pigments. Titanium dioxides useful for purposes of the present invention may include, but are not limited to those sold commercially by Kronos of Houston, Tex., as Kronos™ 2160.

Oils are also useful in the practice of the present invention. Oils are often used in processing thermoplastic elastomers to reduce the friction between polymer chains. Paraffinic oils are used in embodiments of the present. Di-2-ethylhexyl Sebacates are also used in embodiments of the present invention. Suitable paraffinic oils for purposes of the present invention may include, but are not limited to, those sold commercially by Sunoco, Inc., of Philadelphia, Pa. under the trade name Sunpar 2280. Suitable Di-2-ethylhexyl Sebacates for purposes of the present invention may include, but are not limited to those sold commercially by C.P. Hall Company of Chicago, Ill., under the trade name PlastHall DOS.

Thermal stabilizers tend to keep a compound, mixture, or solution from changing its form or chemical nature upon exposure to heat. Useful thermal stabilizers for purposes of practicing the present invention include Tris di-butylphenyl phosphite.

Antioxidants useful for practicing the present invention may include, but are not limited to, those sold commercially as Anox™ PAM 443 by the Great Lakes Chemical Company of LaFayette, Ind.

Combinations of primary and secondary antioxidants may be used for practicing the present invention. Such combinations may include, for example, sterically hindered phenolics with phosphites or thioethers (such as hydroxyphenylpropionates with aryl phosphates or thio ethers), or amino phenols with aryl phosphates. Suitable hindered-phenolic antioxidants for purposes of this invention include: tetrakis [methylene(3,5-di-tert-butyl-4-hydroxyhydrocinnamate)] methane sold commercially as Irganox™ 1010 by the Ciba-Geigy Corporation of Tarrytown, N.Y.; octadecyl 3,5-di-t-butyl-4,hydroxyhydrocinnamate also sold by the Ciba-Geigy Corporation as Irganox™ 1076; the butylated reaction product of p-cresol and dicyclopentadiene sold commercially as Wingstay™ L by Goodyear of Akron, Ohio; 1,3,5-trimethyl-2,4,6-tris(3,5-di-t-butyl-4-hydroxybenzyl)-benzene sold by the Ethyl Corporation of Baton Rouge, La., as Ethanox™ 330; 1,3,5-tris(3,5-di-t-butyl-4-hydroxybenzyl)isocyanurate sold by the R. T. Vanderbilt Company of Norwalk, Conn., as Agerite™ GT; tris (mixed mono and dinonyl phenyl) phosphite with 1% triisopropanolamine sold commercially by Uniroyal Chemical Company of Middlebury, Conn., as Polygard™ HR; bis(2,4-di-t-butylphenyl)pentaerythritol diphosphite, 0.5–1.2% triisopropanolamine sold commercially as Ultranox™ 626 by General Electric Specialty Chemicals of Parkersburg, W. Va.; and dilauryl thiodipropionate sold under the trade name DLTDP by the Petroleum Specialties Group of the Witco Corporation of Greenwich, Conn.

It has been found that imidazole-type inhibitors show improved results when used in a synergistic combination with hindered-phenolic antioxidants. Suitable imidazole-type inhibitors for purposes of practicing the present invention include: zinc 2-mercaptotoluimidazole sold commercially as Vanox™ ZMTI by R.T. Vanderbilt of Norwalk, Conn.; zinc 2-mercaptobenzimidazole sold commercially as Naugard™ ZMB by Uniroyal Chemical Company of Naugatuck, Conn.; and zinc 2-mercapto-4 (5) -methylbenzimidazole sold commercially as Vulkanox™ ZMB-2/C by Mobay Chemical of Pittsburgh, Pa.

Ultraviolet Stabilizers, also known as UV stabilizers or light stabilizers, improve a compound's stability during exposure to ultraviolate radiation. Examples of effective UV stabilizers are: 2-Hydroxy-4-octoxybenzophenone and polymethylpropyl-3-oxy[4(2,2,6,6-tetra-methyl) piperidinyl] siloxane in polypropylene. UV stabilizers useful in practicing the present invention include, but are not limited to, those sold under the trade names Uvasil 2000 HM and Lowilite 22 by the Great Lakes Chemical Company of Lafayette, Ind.

In preparing useful compositions of the present invention, the polyolefins (i.e., the PP random copolymers and the m-PE copolymers) are typically employed in amounts ranging from about 50 to about 90 parts by weight polyolefins phr. The PP random copolymers are typically employed in amounts of from about 1 to about 40 parts by weight PP random copolymers, while the m-PE copolymers are typically employed in amounts of from about 20 to about 90 parts by weight.

In preparing useful compositions of the present invention, rubber compatibilizers are typically employed from about 10 to about 50 parts by weight. In one embodiment of the present invention, about 15 to about 25 parts by weight are preferably employed. In another embodiment of the present invention, about 10 to about 20 parts by weight are preferably employed. In yet another embodiment of the present invention, about 30 to about 40 parts by weight are preferably employed.

In preparing useful compositions of the present invention, cross-linking agents are typically employed from about 0.5 to about 1.5 parts by weight linking agents.

In preparing useful compositions of the present invention, fillers are typically employed from about 5 to about 90 parts by weight fillers.

Those skilled in the art will be able to choose a useful amount of the other ingredients that may be employed in these thermoplastic vulcanizate compositions. For example, it is generally known that flame retardants are typically employed in an amount from about 5 to about 15 parts by weight. However, in the present invention, larger amounts up to about 80 parts of flame retardants may be added. Pigments are typically employed in an amount from about 1 to about 25 parts, while oils are typically employed in an amount from about 1.0 to about 20 parts. Stabilizers are typically employed in an amount from about 0.05 to about 2 parts by weight per 100 parts rubber.

A benefit of the present invention is that the thermoplastic vulcanizate can be melt blended on ordinary equipment such as Banbury mixers, a two-roll mill and three-roll calender, typically used for processing PVC or EPM/EPDM, with no special modification. Dynamic vulcanization is effected by mixing the thermoplastic elastomer components at elevated temperatures. Generally, after a reasonably homogenous mixture of the two phases is established, the cross-linking agent is added.

The thermoplastic vulcanizate is processed into sheets by either extrusion or calendering. Roofing compositions of the present invention typically are extruded or calendered into sheets of between about 0.02 mm and about 2.0 mm, preferably between about 0.10 mm and about 1.0 mm. Typically, roofing membranes of the present invention have two melting points by differential scanning calorimetry (DSC), one at 139° C., and the other at 64° C. When roofing compositions of the present invention are between 0.02 mm and 2.0 mm, they may be heat welded, melting together with another such membrane at their edges, to form a continuous watertight membrane after application of hot air at no more than 120° C., preferably no more than 110° C. in less than 2 seconds.

By way of one example, two thermoplastic vulcanizates—one white (TPV-White) and one black (TPV-Black), were made using PP random copolymers containing about 97 percent by weight repeating propylene monomer units and about 3 percent by weight repeating ethylene co-monomer units; metallocene-catalyzed ethylene copolymer containing about 75 percent by weight repeating ethylene monomer units and about 25 percent by weight repeating octene α-co-monomer units; and EVA as the compatibilizing rubber. Calcium carbonate with 40 percent active dicumyl peroxide, along with N,N'-m-phenylene dimaleimide as a catalyzing agent, was used for dynamic cross-linking. Paraffinic oils and Sebacates were used to reduce the friction between polymer chains. The Non-halogenated flame retardant comprising Stearic Acid treated Magnesium Hydroxide was used for the TPV-Black; and Amiosilicone Magnesium Hydroxide was used for the TPV-White. Titanium Dioxide was used as the pigment in the TPV-White; and in the TPV-Black, Carbon Black filler provided the pigment. A mineral-type acid scavenger thermal stabilizer and a benzophenone UV stabilizer were added to the TPV-White for good exterior weathering. Additionally, a light stabilizer was added to both samples. Also, a sterically-hindered phenolic anitoxidant was added to both samples. Table I, below, shows a description of the relative amounts of the ingredients used to make the thermoplastic vulcanizates of this example.

TABLE I

| TPV Ingredient | TPV-White Parts by Weight phr | TPV-Black Parts by Weight phr |
|---|---|---|
| PP Random Copolymers | 18 | 17 |
| m-PE Copolymers | 60 | 62 |
| EVA Compatibilizing Rubber | 22 | 21 |
| Peroxide-Based Cross-linking Agent | 0.1 | 0.7 |
| N,N'-m-Phenylene Dimaleimide Catalyzing Agent | 0.35 | 0.35 |
| Paraffinic Oils | 6 | 6 |
| Di-2-Ethylhexyl Sebacates | 4 | 4 |

TABLE I-continued

| TPV Ingredient | TPV-White Parts by Weight phr | TPV-Black Parts by Weight phr |
|---|---|---|
| Stearic acid treated Magnesium Hydroxide | 50 | |
| Aminosilane treated Magnesium Hydroxide | | 10 |
| Talc | 7 | 7 |
| Titanium Dioxide Pigment | 7.5 | 1 |
| Carbon Black | | 15 |
| Mineral-Type Acid Scavenger | 0.5 | |
| Antioxidant | 0.2 | 0.1 |
| Benzophenone UV Stabilizer | 0.15 | |
| UV Stabilizer | 0.15 | 0.1 |
| Total Wt: | 176.55 | 144.25 |
| Total Density: | 1.175 | 1.034 |

The physical properties of the two prepared vulcanizates were compared to their counterparts used in roofing membranes: standard plastics TPO (Std Roofing TPO), EPDM-based TPV (Commercial TPV+23% FR), and EPDM-based rubber (Std Roofing EPDM). In comparing the relative flame resistance of the compounds, 23% of Mag FR20/120D was added to the EPDM-based TPV in order to ensure its relative uniformity regarding amount of flame retardant within the composition. The results are given in Table II below.

Both the prepared TPV-White and TPV-Black vulcanizates showed higher Tensile Energy than their counterparts used in roofing, especially after oven-aging. This means that the TPV vulcanizates can continue to support tensile load, while the standard plastics TPO becomes ductile after passing its yielding point. The Die-C Tear Energy indicates that the TPV vulcanizates show no yielding point on tensile curves. The TPV vulcanizates have much higher Die-C Tear Strength and Die-C Tear Energy than the EPDM-based TPV. These elastic properties also shows in the Tension Set. The TPV vulcanizates have much lower Tension Set than the standard plastics TPO, although not as low as the EPDM-Based Rubber. Low Tension Set can pull back the scrim to continue support the membrane when the membrane is under cyclic wind test or fatigue test. Low Tension Set also means that membrane shape recovery after wind loading will be better for membranes made from the TPV vulcanizates than for membranes made from the standard plastics TPO. The tensile elongations after heat aging for the TPV vulcanizates are much greater than the tensile elongations for membranes made from the EPDM-based rubber and the EPDM-based TPV.

TABLE II

| Compound Properties | TPV-White | TPV-Black | Std TPO | TPV + 23% Mag | Std EPDM |
|---|---|---|---|---|---|
| Hardness (Shore A) @ 23° C. | 89 | 88 | 90 | 95 | 65 |
| 100% Tensile Modulus @ 23° C. | 799 | 954 | 885 | 800 | 421 |
| (300% Modulus/100% Modulus) @23° C. | 1.18 | 1.37 | 1.08 | 1.17 | 2.59 |
| Tensile Strength, Tb/Eb @ 23° C. (psi %) | 1731/733 | 1894/636 | 1948/745 | 1432/612 | 1536/499 |
| Aged Tensile Strength, Tb/Eb, (psi %) | 1867/714 | 2029/689 | 1557/690 | 1203/484 | 1640/266 |
| Tensile energy @ (23° C./Aged), (lbf-in) | 118/107 | 122/133 | 107/74 | 72/58 | 49/25 |
| Die-C Tear Strength (23° C./Aged) (PLI) | 382/383 | 444/459 | 367/350 | 316/319 | 238/224 |
| Die-C Tear Energy @ 23° C., (lbf-in) | 51 | 49 | 22 | 16 | 44 |
| Dimensional Stability, avg (X/Y), (%) | −1.3 | −2.0 | −0.12 | −0.71 | |
| Tension Set @ 23° C., 100% (%) 25 UL 94 HF1 | 33 | 26 | 52 | 33 | 0 |

A second example shows that the compatibilizing rubber useful for dynamic cross-linking is not confined to EVA. In the following case, Sample A was prepared using high MA as the compatibilizing rubber; and Sample B was prepared using EMA as the compatibilizing rubber. In this example, the following were also used: PP random copolymers having about 97 percent by weight repeating propylene monomer units and about 3 percent by weight repeating ethylene co-monomer units; metallocene-catalyzed polyethylene copolymers having about 85 percent by weight repeating ethylene monomer units and about 15 percent by weight repeating octene α-co-monomer units; calcium tricarbonate with 40 percent by weight active dicumyl peroxide as cross-linking agent; a sterically hindered phenolic antioxidant; and a phosphite antioxidant. Table III sets forth the relative amounts of the ingredients used in this example.

TABLE III

| Ingredient | A Parts by Weight phr | B Parts by Weight phr |
|---|---|---|
| PP Random Copolymers | | 14 |
| m-PE Copolymers | 85 | 51 |
| MA | 15 | |
| EMA | | 35 |
| Peroxide-based Crosslinking Agent | 0.75 | 0.75 |
| N,N'-m-Phenylene dimaleimide Catalyzing Agent | 0.4 | 0.4 |
| Titanium Dioxide Pigment | 5 | 7.5 |
| Antioxidant (ciba) | 0.1 | 0.1 |
| Sterically-hindered Phenolic Antioxidant | 0.1 | 0.1 |
| Benzophenone UV Stabilizer | 0.2 | 0.15 |

TABLE III-continued

| Ingredient | A Parts by Weight phr | B Parts by Weight phr |
|---|---|---|
| UV Stabilizer | 0.2 | 0.15 |
| Silane-treated Magnesium Hydroxide | 50 | 25 |
| Stearic acid-treated Magnesium Hydroxide |  | 20 |
| Talc | 10 | 7 |
| Total Wt: | 167.55 | 161.15 |
| Total Density: | 1.192 | 1.190 |

PROPERTIES OF OVERALL COMPOSITION

The physical properties of the two compounds are listed in Table IV.

TABLE IV

| Compound Properties | A | B |
|---|---|---|
| Hardness (Shore A), @ 23° C. | 75 | 88 |
| 100% Tensile Modulus @ 23° C. | 572 | 930 |
| 300%/100% Modulus ratio | 1.45 | 1.30 |
| Tensile Strength, Tb (psi) | 1193 | 1255 |
| Eb, Elongt'n-break @ 23° C. (%) | 805 | 553 |
| Tensile set @ 23° C., 100% (%) | 11% | 29% |
| Die-C Tear Strength | 273 | 387 |
| UL94 HF-1 rate (mm/min) | 0.08 |  |
| Capillary viscosity @ 122s-1, 190 C (P) |  | 1352 |

Compound A has a much higher 300%/100% Modulus Ratio than Compound B meaning its elasticity is much higher due to higher cross-linking of the MA rubber. Higher cross-linking of the MA rubber (62% MA in MA rubber versus 27% MA in EMA) also explains why Compound A has lower Tension Set than Compound B. Compound A also has much lower 100% Tensile Modulus than Compound B meaning it is softer or more pliable. Using a softer polyolefin matrix (PP random copolymer and m-PE copolymer having from about 10 to about 30 weight percent α-co-monomer content) will make the compound softer, more elastic and more pliable.

The compositions of the present invention represent a significant advance in the practice of roofing membranes for commercial buildings inasmuch as they display improved properties as compared with their commercial counterparts used for roofing membranes including higher tensile energy, more continuous supporting power, less apparent yield, higher tear strength, higher tear energy, improved welding stability and improved tensile elongation after thermal aging.

Various modifications and alterations that do not depart from the scope and spirit of this invention will become apparent to those skilled in the art. This invention is not to be duly limited to the illustrative embodiments set forth herein.

What is claimed is:

1. A thermoplastic vulcanizate comprising:
   a reaction product of a blend of
   at least one polypropylene random copolymer;
   at least one polyethylene copolymer containing at least 70% ethylene monomer units and at least 10 percent α-olefin co-monomer units by weight;
   at least one compatibilizing rubber selected from the group consisting of ethylene vinyl acetate, ethyl methyl acrylate, and methyl acrylic rubber; and
   at least one peroxide-based cross-linking agent, wherein the compatibilizing rubber is simultaneously dispersed throughout the polymer matrix and cross-linked.

2. The thermoplastic vulcanizate of claim 1 wherein said polypropylene random copolymer comprises:
   from about 50 to about 99 percent by weight of repeating propylene monomer units; and
   from about 1 to about 50 percent by weight of repeating ethylene co-monomer units;
   wherein the repeating propylene monomer units and the repeating ethylene co-monomer units are randomly polymerized throughout the copolymer.

3. The thermoplastic vulcanizate of claim 1 wherein said polyethylene copolymer comprises:
   from 70 to about 90 percent by weight of repeating ethylene monomer units; and
   from 10 to about 35 percent by weight of repeating α-olefin co-monomer units having from 4 to 8 carbon atoms.

4. The thermoplastic vulcanizate of claim 1 wherein said polyethylene copolymer comprises:
   from about 78 to about 82 percent by weight of repeating ethylene monomer units; and
   from about 18 to about 22 percent by weight of repeating α-olefin co-monomer units having from 4 to 8 carbon atoms.

5. The thermoplastic vulcanizate of claim 1 wherein said polyethylene copolymer has high melt flow.

6. The thermoplastic vulcanizate of claim 1 wherein said repeating α-olefin co-monomer unit is butene, hexene or octene.

7. The thermoplastic vulcanizate of claim 1 wherein said polyethylene copolymer comprises a metallocene-catalyzed polyethylene copolymer.

8. The thermoplastic vulcanizate of claim 7 wherein said metallocene-catalyzed polyethylene copolymer comprises:
   from 70 to about 90 percent by weight of repeating ethylene monomer units; and
   from 10 to about 35 percent by weight of repeating α-octene co-monomer units,
   wherein the repeating ethylene monomers units and repeating α-octene co-monomer units are randomly polymerized throughout the copolymer.

9. The thermoplastic vulcanizate of claim 1 wherein said peroxide-based cross-linking agent comprises 40 percent by weight dicumyl peroxide supported on calcium tricarbonate.

10. The thermoplastic vulcanizate of claim 1 further comprising a dynamic vulcanization catalyzing agent.

11. The thermoplastic vulcanizate of claim 1, comprising:
   from about 1 to about 40 parts by weight of at least one polypropylene random copolymer having an ethylene co-monomer content of from about 1 to about 10 percent;
   from about 20 to about 90 parts by weight of at least one polyethylene copolymer having a α-olefin co-monomer content of from 10 to about 30 percent by weight; and
   from about 10 to about 50 parts by weight of at least one compatibilizing rubber, so as to provide 100 parts by weight rubber to the thermoplastic vulcanizate.

12. The thermoplastic vulcanizate of claim 11, further comprising from about 0.5 to about 1.5 parts by weight crossing linking agent per 100 parts rubber.

13. The thermoplastic vulcanizate of claim 11, further comprising from about to about 90 parts by weight filler per 100 parts rubber.

14. The thermoplastic vulcanizate of claim 13, wherein said filler includes from about 5 to about 70 parts by weight flame retardants per 100 parts rubber.

15. The thermoplastic vulcanizate of claim 14, wherein said flame retardants include both aluminum trihydrate and magnesium hydroxide, and wherein the decomposition temperature of said aluminum trihydrate is increased in the vulcanizate as compared to other vulcanizates not including a compatibilizing rubber.

16. A roofing membrane comprising at least one ply of material comprising a thermoplastic vulcanizate, said thermoplastic vulcanizate comprising:
   a reaction product of a melt blend of
   at least one polypropylene random copolymer;
   at least one polyethylene copolymer containing from about 10 to about 30 percent by weight of repeating α-olefin co-monomer units;
   at least one compatibilizing rubber selected from the group consisting of ethylene vinyl acetate, ethyl methyl acrylate, and methyl acrylic rubber;
   at least one peroxide-based cross-linking agent;
   at least one filler; and
   optionally, one or more additives selected from the group consisting of oils, pigments, thermal stabilizers, antioxidants, imidazole-type inhibitors, and UV or light stabilizers;
   wherein the compatibilizing rubber is simultaneously dispersed throughout the polymer matrix and cross-linked.

17. The roofing membrane of claim 16, wherein the thermoplastic vulcanizate comprises
   from about 1 to about 40 parts by weight of at least one polypropylene random copolymer having an ethylene co-monomer content of from about 1 to about 10 percent;
   from about 20 to about 90 parts by weight of at least one polyethylene copolymer having a α-olefin co-monomer content of from about 10 to about 35 percent by weight; and
   from about 10 to about 50 parts by weight of at least one compatibilizing rubber, so as to provide 100 parts by weight rubber to the thermoplastic vulcanizate.

18. The roofing membrane of claim 17, further comprising from about 0.5 to about 1.5 parts by weight crossing linking agent per 100 parts rubber, and from about 5 to about 90 parts by weight filler per 100 parts rubber.

19. The roofing membrane of claim 18, wherein said filler includes from about 5 to about 70 parts by weight flame retardants per 100 parts rubber.

20. A method for making a roofing membrane comprising:
   preparing a thermoplastic vulcanizate by melt blending at least one polypropylene random copolymer; at least one polyethylene copolymer containing from about 10 to about 35 percent by weight of repeating α-olefin co-monomer units; at least one compatibilizing rubber selected from the group consisting of ethylene vinyl acetate, ethyl methyl acrylate, and methyl acrylic rubber;
   at least one peroxide-based cross-linking agent; and at least one filler; and
   extending or calendering the thermoplastic vulcanizate into thin sheets.

21. A bilaminate roofing membrane comprising:
   a first layer of a non-black sheeting comprising a thermoplastic vulcanizate formed from the reaction product of a melt blend comprising:
   at least one polypropylene random copolymer;
   at least one polyethylene copolymer containing from about 10 to about 35 percent by weight of repeating α-olefin co-monomer units;
   at least one compatibilizing rubber;
   at least one peroxide-based cross-linking agent;
   at least one non-black filler; and
   optionally, one or more additives selected from the group consisting of oils, thermal stabilizers, antioxidants, and UV or light stabilizers, wherein the compatibilizing rubber is simultaneously dispersed throughout the copolymer matrix and cross-linked; and
   a second layer of a black sheeting comprising a thermoplastic vulcanizate formed from the reaction product of a melt blend comprising:
   at least one polypropylene random copolymer;
   at least one polyethylene copolymer containing from about 10 to about 35 percent by weight of repeating α-olefin co-monomer units;
   at least one compatibilizing rubber;
   at least one peroxide-based cross-linking agent;
   at least one black filler; and
   optionally, one or more additives selected from the group consisting of oils, thermal stabilizers, antioxidants, and UV or light stabilizers; wherein the compatibilizing rubber is simultaneously dispersed throughout the copolymer matrix and cross-linked; and wherein said first and second layers are attached together.

22. A thermoplastic vulcanizate comprising:
   a reaction product of a blend of
   at least one polypropylene random copolymer;
   at least one polyethylene copolymer containing from about 10 to about 30 percent by weight α-olefin co-monomer units;
   at least one compatibilizing rubber; and
   at least one peroxide-based cross-linking agent,
   wherein the compatibilizing rubber is selected from the group consisting of ethylene vinyl acetate, ethyl methyl acrylate, and methyl acrylic rubber.

23. The thermoplastic vulcanizate of claim 22 wherein said polyethylene copolymer comprises a metallocene-catalyzed polyethylene copolymer.

24. The thermoplastic vulcanizate of claim 22 wherein said compatibilizing rubber is selected from the group consisting of ethylene vinyl acetate, ethyl methyl acrylate, and methyl acrylic rubber.

25. The thermoplastic vulcanizate of claim 1 wherein said polyethylene copolymer comprises a metallocene-catalyzed polyethylene copolymer.

26. The method of claim 20 wherein said polyethylene copolymer comprises a metallocene-catalyzed polyethylene copolymer.

* * * * *